United States Patent Office 3,400,021
Patented Sept. 3, 1968

3,400,021
CONVERSION COATING COMPOSITIONS
AND METHOD
Edward Heinzelman, Jr., Palisades Park, N.J., assignor to Oakite Products Inc., New York, N.Y., a corporation of New York
No Drawing. Continuation-in-part of application Ser. No. 153,717, Nov. 20, 1961. This application Mar. 15, 1967, Ser. No. 626,913
18 Claims. (Cl. 148—6.1)

ABSTRACT OF THE DISCLOSURE

This invention embraces water-soluble mixture compositions and water-soluble aqueous concentrates thereof, which contain as their essential ingredients (a) a chromium trioxide-providing substance and (b) a water-soluble lithium salt whose anion is other than fluorine-containing; from which compositions or concentrates there are prepared dilute aqueous conversion or complex coating baths, in which are carried out the method of the invention wherein ferrous and non-ferrous metals subjected to immersion in the baths receive over their immersed surfaces a corrosion resistant reaction conversion coating.

---

This application is a continuation-in-part of my copending application Ser. No. 153,717, filed Nov. 20, 1961, now abandoned.

This invention is that of water-soluble mixture compositions and water-dilutable aqueous concentrates, which contain as their essential ingredients (a) chromium trioxide and (b) a water-soluble lithium salt, from which compositions or concentrates there are prepared dilute aqueous conversion or complex coating baths which, as a part of the invention, produce highly corrosion resistant complex or conversion coatings on the surfaces of ferrous and also non-ferrous metals immersed in these coating bath solutions. (Immersion includes wetting by submerging, dipping in, brushing on, spraying, rolling, or otherwise drenching.)

The invention includes also the method of producing such complex or conversion coatings on such metal surfaces by immersing objects or devices of any of those various metals in an aqueous coating bath containing (a) chromic acid (i.e. chromium trioxide) and (b) a water-soluble lithium salt (lacking a fluorine-containing anion), and in such ratio to one another and sufficient respective concentration in the coating bath to produce such coating on the immersed surfaces of the treated product, and for a time sufficient for the desired extent of coating to be obtained.

A feature of the invention is that not only the dry mix compositions, but also the aqueous concentrates as well as the aqueous coating baths prepared from either of them are entirely stable and have unusually extended life. In essence any of these three forms of compositions of the invention is primarily inorganic constituted so that their essential ingredients are entirely ionizable in water.

This feature of the unusual stability of these various composition forms of the invention is manifested by the aqueous concentrates, and especially the diluted coating baths, by their showing no or at most insignificantly little sedimentation, even at the elevated temperatures at which they generally are used. The composition thus is reproducible and predictable.

It is a further feature of the compositions of the invention that the coating baths are readily effective to produce the complex or conversion coatings without any special pretreatment (e.g. acid etch) of the metal surface other than any suitable one of the common cleaning treatments if the surface of the metal to be treated initially is soiled so as to need cleaning. Thus, the method of the invention is simple and remarkably practical.

Yet another feature of these compositions is their applicability to both ferrous and non-ferrous metal surfaces.

A still further feature of the compositions of the invention is their utility not only to provide a suitable conversion coating applicable as a finished coating but also as a corrosion resistant base coating or under-coating for a subsequent organic coating such as an organic resin, lacquer or paint outer coating. Thus, these conversion coatings manifest improved adhesion and render superior service. When used as the finished coating, the coating produced provides superior corrosion resistance without any supplemental or organic finish.

When the conversion coatings to be produced with the compositions, and by the method, of this invention are to serve as final coatings, the initial dry mix composition or aqueous concentrate and treating bath can include a water-soluble or water-dispersible dye or pigment compatible with chromic acid to provide the corresponding color in the finished conversion coating.

An adidtional feature of the invention is that the complex or conversion coatings provided are resistant to organic solvents and manifest exceptional adhesion and ductility and corrosion resistance.

The coating baths of the invention also can be used as an after or final rinse coating over other earlier complex or conversion coatings, for example, phosphate coatings and black oxide treatments, to provide a thus modified final coating manifesting improved corrosion resistance properties over those of the original coating alone.

Still a further feature of the invention is the ease and quickness with which the complex or conversion coating is produced by its compositions, baths and method, generally in a comparative short time of exposure to the bath within thirty seconds and as little as a few or several seconds. No special further treatment need be given then to the articles treated in the conversion coating baths of this invention after they are withdrawn from the bath, other than simple drying usually at elevated temperatures below 100° C. and readily simply with hot air, or merely a water rinse followed by such drying.

The color of the finished metallic complex coating generally does not change when, after having been dried, the article then is heated to a temperature above that at which it was dried. Obviously, that does not apply to any organic dye in the coating when heated to a temperature at which the organic dye can discolor, or to any pigment in it, when heated to a higher temperature at which its color might change.

Considered broadly, the compositions of the invention, whether dry mix, aqueous concentrate, or diluted treating or coating bath, contain (a) chromic acid and/or a water-soluble dichromate together with (b) a water-soluble lithium salt (without any fluorine-containing anion) and in such proportion that the chromium trioxide content (i.e. included either as such or of any dichromate used) markedly exceeds the total content of lithium (as cation of its salt).

The number of different metal surfaces on which the bath compositions of the invention produce highly desirable corrosion resistant conversion coatings as well as the number of different applicable water-soluble lithium salts, and the widely effective pH range, make it difficult to give a single numerical range of content or proportions for the chromium and lithium substances required as the essential ingredients, to fit all of the possible combinations of the several variables.

Ordinarily, chromium by weight should be at least equal to, and beneficially greater than, that of lithium cation. A good practical minimum is about 1.5 parts of chromium to one part of lithium, and better yet about five parts of chromium to about three parts of lithium. For generally good practical operation, the chromium should be at least about seven times the lithium cation content (i.e. in the selected water-soluble lithium salt or salts) and can run up to about one thousand parts of chromic oxide per part of lithium cation, and possibly somewhat higher. All these parts are by weight.

The aqueous concentrate can contain the substance providing the chromic oxide (i.e. whether as chromium trioxide itself or as a water-soluble dichromate) in a weight range of from about one to ninety parts of chromic oxide to from about three-tenths, or even as little as one-tenth, part of lithium cation.

The dilute treating or coating bath then can contain the chromic acid (either as such or from a water-soluble dichromate) and the lithium cation within the ratios of chromium to lithium indicated in the two immediately preceding paragraphs. However, such bath should contain by weight a minimum of about three-tenths percent of lithium cation (of its water-soluble salt) with the corresponding amount of chromic oxide (i.e. taken either as such or from a water-soluble dichromate) within the ratio range therein indicated. The generally practical minimum concentration of chromium is about five-tenths percent.

The chromium trioxide (i.e. chromic anhydride or chromic acid) can be used as such in any of its commercially readily available forms. The readily available technical grade of its granular powder form is most desirable and beneficial. However, chromium trioxide can be replaced in part or as a whole by the chromium trioxide equivalent of any water-soluble dichromate, for example, an alkali metal dichromate such as sodium dichromate, potassium dichromate, lithium dichromate, with ammonium dichromate considered as if it were an alkali metal dichromate, or any compatible water-soluble polyvalent metal dichromate such as zinc dichromate.

Any water-soluble lithium salt, whether with an inorganic or organic anion (so long as it is not fluorine-containing), can be used, such as lithium nitrate, lithium chloride, lithium sulfate, lithium chromate, lithium dichromate, lithium molybdate, lithium titanate, lithium thiocyanate, and lithium vanadate; or that of a lower alkanoic acid, as lithium formate and lithium acetate, or of such hydroxy acid, e.g. lithium citrate, lithium lactate, lithium oxalate, lithium tartrate, and lithium bitartrate; or that of benzene substituted with an acid group, as lithium phenolate from a hydroxy-benzene, lithium benzoate from a carboxybenzene, lithium phenolsulfonate from a hydroxy benzenesulfonic acid, and lithium salicylate from a hydroxy benzoic acid, and lithium acetylsalicylate, and others.

More than one such lithium salt can be used in the same composition. It is possible to use lithium dichromate without added chromic acid because lithium dichromate furnishes both chromic acid (in the form of dichromate) and lithium cation within the applicable ratios. Any water-soluble lithium salt of an organic acid which is inert to chromic acid is applicable (although in some operations some of them may not be readily desirable because of cost).

Thus, where the fifth paragraph of this specification states that the compositions of the invention are "primarily inorganic constituted," it refers to that feature of the essential metal elements in the required water-soluble constituents. In other words, the substance providing chromium trioxide is inorganic and the water-soluble lithium salt provides the essential inorganic cation lithium which acts jointly with the chromium to produce the advantageous corrosion resistant conversion coating, even though the anion in some lithium salt might be organic.

While the active highly corrosion resistant conversion coating producing constituents of the compositions of the invention consist essentially of the chromium trioxide (or water-soluble dichromate) and the essential accompanying water-soluble lithium salt, any of the dry mix, the aqueous concentrate, and the treating bath can include also a minor percentage of one or more compatible agents for any other specific purposes. Thus, any of them can include a buffering agent, for example, an alkali metal acetate as sodium or potassium acetate (e.g. for pH 2) or ammonium acetate, or an alkali metal phosphate such as sodium or potassium dihydrogen phosphate, or ammonium dihydrogen phosphate included with them, or the citrates of those same cations, or sodium tetraborate, potassium hydrogen tartrate, or potassium hydrogen phthalate, to serve to stabilize the resulting treating bath at a desirable pH value.

In some circumstances, a compatible surface active agent, beneficially an anionic one, such as sodium lauryl sulfate, can be included to enhance certain operating steps, for example, drainage of adhering or entrained bath solution from the treated articles being removed from the bath, or enhancing the subsequent rinsing step.

The compositions of the invention serve to produce the highly corrosion resistant conversion coatings on a metal ordinarily subject to corrosion on sufficient exposure therefor to a corrosion-inducing atmosphere. Examples of such metals are steel, wrought or cast iron and other ferrous metals. Others on which they also can likewise be produced correspondingly similar highly corrosion resistant conversion coatings are non-ferrous metals not only such as the so-called white metals, aluminum, magnesium, zinc, and their alloys not alone those wherein each of them separately predominates, but also nickel, copper, and tin, and alloys such as of the latter two, as brass and bronze and others.

The conversion coatings produced by the treating baths of the invention, for example, prevent so-called white rust on non-ferrous metals such as aluminum and zinc.

Speaking generally, the method of the invention comprises immersing an article or device of the specific ferrous or non-ferrous metal, or composed of parts of different ones of those metals, in an aqueous treating bath containing an adequate amount of a water-soluble lithium salt to provide a sufficient concentration of lithium cation, together with the corresponding quantity of chromic acid (taken either as such or as a water-soluble dichromate) at least about double the quantity of lithium cation, and for a time sufficient to produce a suitably highly corrosion resistant conversion coating under the operating conditions; removing the article or device when development of the desired coating on it is noted; and drying the device. The bath should contain by weight at least about one percent of chromium trioxide and about one-tenth, and beneficially at least about three-tenths, percent of lithium cation.

The various types of compositions, as well as the method of this invention are illustrated by, but not restricted to, the following examples:

DRY MIXES

Example 1.—Chromic oxide and lithium salt alone (a) Eighty pounds of technical grade chomic oxide granular powder are admixed uniformly with twenty pounds of lithium nitrate.

(b) Seventy pounds of the same chromic oxide are admixed uniformly with thirty pounds of lithium molybdate.

Example 2.—With buffer 73.1 pounds of chromic oxide (as of Example 1) are admixed uniformly with 19.2 pounds of lithium nitrate, and 7.7 pounds of potassium acetate.

Example 3.—(a) With buffer

Seventy pounds of chromic oxide (as of Example 1) are admixed uniformly with twenty pounds of lithium molybdate and ten pounds of potassium acetate.

(b) With dichromate and buffer

The lithium molybdate of part (a) are replaced by the same weight of lithium dichromate.

Example 4.—With wetting agent (a) Sevently pounds of chromic oxide (as of Example 1) are admixed uniformly with twenty pounds of lithium acetate, nine pounds of potassium acetate, and one pound of "Duponol D" (i.e. sodium lauryl and oleyl sulfates).

(b) Seventy pounds of the chromic oxide are admixed uniformly with twenty pounds of lithium molybdate, nine pounds of lithium nitrate, and one pound of "Duponol OS" amine mixed long chain (e.g. lauryl and oleyl) sulfates.

AQUEOUS CONCENTRATES

Example 5

(a) Forty-seven pounds of the chromic oxide and thirteen pounds of lithium nitrate dissolved in forty pounds of water.

(b) Forty-seven pounds of the chromic acid, thirteen pounds of lithium nitrate, and five pounds of potassium acetate are dissolved in thirty-five pounds of water.

Conversion coating baths are prepared by diluting from one-half pound to ten pounds of either of these concentrates (a) and (b) respectively with an amount of water sufficient to make a total of one hundred pounds of the resulting dilute treating bath composition.

CONVERSION COATING BATHS AND METHOD

In the following examples panels of cold rolled low carbon steel and also of SAE 3003–H14 aluminum were treated as recited in the respective examples:

Example 6

(i) The steel panels first were cleaned by immersion for five minutes in an alkaline cleaning bath maintained at 180° F. to 200° F. and containing one pound per gallon of water of an alkali and chelate cleaner dry mix composed of 62.5% of caustic soda, 31.25% of sodium gluconate, and 6.25% of a non-ionic wetting agent.

The aluminum panels initially were cleaned by immersion for five minutes in a silicated alkaline cleaning bath maintained at 180° to 200° F. and containing from four to eight ounces per gallon of water of the anhydrous sodium metasilicate, sodium bicarbonate, sodium tripolyphosphate, and wetting agents cleaning composition shown in Metal Progress of November 1959, page 114, "Alkaline Cleaning of Metals," Table IV.

(ii) The panels then were put through a cold water rinse usually for a half minute to a minute.

(iii) Then the thus rinsed panels were immersed for thirty seconds in an aqueous conversion coating bath solution containing by weight ten percent of chromic oxide (as of Example 1) and three percent of lithium nitrate, and maintained at 80° F.

(iv) The panels then were removed and blown dry by a hot air blast.

(v) The steps of this example were repeated on panels of the same two metals, but instead of drying them by hot air blast in its step (iv), the panels were baked in an oven for five minutes at 250° F.

The various steps of the two foregoing modifications of this example were repeated, but instead of immersing the panels in the step (iii) conversion coating bath, the rinsed panels were immersed in a dilute treating solution containing by weight ten parts of the dry mix of Example 2 dissolved in ninety parts of water.

Example 7.—Nitric acid pre-dip

Steel and also aluminum panels as used in Example 6 were treated as in its various steps. However, before immersing them in the conversion coating bath of its step (iii), the panels were immersed for five seconds in an aqueous nitric acid dip maintained at 80° F. and containing three percent by volume of 42° Baumé nitric acid, and followed by a cold water rinse as in its step (ii). The panels manifested somewhat better appearance as to continuity of uniformity.

Example 8.—Added zinc molybdate

Steel and also aluminum panels as used in Example 6 were treated as in its various steps, except that one-half of the lithium nitrate of its conversion coating bath was replaced by the same weight of zinc molybdate.

The various steps of this example were repeated on panels of the same two metals, but instead of hot air blast drying the treated panels, they were oven baked for five minutes at 250° F.

The various steps of this example were repeated on other panels of the same two metals, but before immersing them in the conversion coating bath of step (iii), the panels were immersed for five seconds in a nitric acid dip as in Example 7 and followed by a cold water rinse as after the initial cleaning step.

The herein coated panels appeared about the same as in Example 6 and manifested somewhat better corrosion resistance.

Example 9.—With buffer

Steel and also aluminum panels as used in Example 6 were treated as in its various steps, except that one-half percent of potassium acetate by weight was added to its conversion coating bath and buffered its solution at pH 2, with relatively similar results in the finished panels.

The steps of this example were repeated on other panels of the same two metals, but instead of hot air blast drying the treated panels, they were oven baked for five minutes at 250° F. No change was noted over the appearance of the hot air blast dried panels.

The various steps of this example were repeated on other panels of each of the two metals, but after the initial cleaning step and before immersing the cleaned panels in the conversion coating bath, these panels were immersed for five seconds in a nitric acid dip as in Example 7 and followed by a cold water rinse as after the initial cleaning step.

Example 10.—Buffer and wetting agent

Steel and also aluminum panels as used in Example 6 were treated as in the three modifications in Example 9, except that one-quarter percent of the wetting agent "Duponol WA," i.e. sodium lauryl sulfate, by weight was added to its conversion coating bath. The coated panels showed somewhat improved uniformity in coating over those of Example 9 with about equal corrosion resistance.

Example 11.—Dyestuff incorporated

Steel panels as used in Example 6 were cleaned with the alkali and chelate cleaner of its step (i) and rinsed as in its step (ii).

The rinsed panels then were immersed for one to two minutes at ambient temperature in a conversion coating bath composed of five parts by volume of the concentrate of Example 5(a) diluted with ninety-five parts by volume of water, to which bath was added one-half percent by weight of the water-soluble dye National FD & C Red #4—Ponceau SX (available from National Aniline and Chemical Co.).

The panels then were removed and dried at 150° F. for five minutes. The complex conversion coating was red and manifested corrosion resistance (tested by salt spray) equal to and even somewhat better than that of the non-dyed coating produced by a conversion coating bath containing about the same ratio of chromic oxide and lithium nitrate.

In place of the specific dye used in this example, any other suitable water-soluble, acid stable dye can be used.

The pH of the complex conversion coating baths containing dyes was adjusted with sodium hydroxide solution in respective runs from about 2.0 to 6.4 to note the effect of pH on absorption of dye into the resulting coating. Improved coatings (as to absorption of dye) was noted at the higher pH level (i.e., 6.4). This indicates the benefit of taking into consideration the optimum pH level recommended for a particular dye.

Example 12.—Pigment incorporated

Steel panels as used in Example 11 were cleaned and rinsed as described therein. The rinsed panels then were immersed for one to two minutes at ambient temperature in a conversion coating bath composed by weight of forty-seven parts of chromic acid (as of Example 1), thirteen parts of lithium nitrate, thirty-five parts of water, and five parts of carbon black.

The panels then were removed and dried at 150° F. for five minutes. They were coated with a hard even black coating which manifested corrosion resistance (to salt spray) equal to and even somewhat better than that of the non-pigmented coating produced by a conversion coating bath of substantially the same composition without the carbon black.

The carbon black of the conversion coating bath of this example can be replaced by the equivalent concentration of any other compatible pigment, for example, black iron oxide, red iron oxide, chrome green, and others. The various steps of this example are to be considered as repeated separately respectively with the carbon black of the conversion coating bath replaced by an equal amount of each of these other specific pigments respectively, with the resulting coating obtained showing the respective color of the particular pigment and the same quality of corrosion resistance.

AFTER RINSE ON PHOSPHATE COATING

Example 13.—Final rinse on iron or zinc phosphate coating

Iron panels as used in Example 6 were cleaned and rinsed as in its steps (i) and (ii). Some rinsed panels were immersed for five minutes in a phosphatizing bath containing four ounces of the dry powder mix of Example 1 of U.S. Patent 2,502,441 per gallon of water and maintained at 160° to 180° F. Other rinsed panels were immersed similarly in a like phosphatizing bath containing four percent by volume of composition C of U.S. Patent 2,820,731. After removing the panels, they were given a cold water rinse as in step (ii) of Example 6.

Some of the thus rinsed phosphate-coated panels were immersed for thirty seconds in a final rinse treating bath containing one pound of the dry mix of Example 2 hereof dissolved in ninety-nine pounds of water and maintained at 80° F. Other of these rinsed phosphate-coated panels were immersed in a final rinse treating bath containing one-half percent by weight of the dry mix of Example 3. The panels then were removed and blown dry by a hot air blast.

All of these various finished dried panels showed enhanced corrosion resistance (by salt spray test) over the corrosion resistance shown by other panels of the same steel given the same treatment but without the immersion in the final rinse in the bath containing as solute the composition of Example 2 hereof.

Example 14.—Coating bath composition using two lithium salts

Steel panels as used in Example 6 were cleaned in an alkaline cleaning bath of the composition used in it, maintained at 175° F., for one and one-half minutes; and then cold water rinsed for one-half to one minute.

The thus rinsed panels were immersed for thirty seconds in an aqueous conversion coating bath maintained at 80° F. and containing two percent by weight of the dry mix composition of Example 4(b).

The thus treated panels were removed and oven dried in a muffle drier for five minutes at 150° F.

Example 15.—Bath and method with dichromate as one of two chromium sources

Iron panels as used in Example 13 were cleaned and rinsed as in Example 14. The thus rinsed panels then were immersed for thirty seconds in an aqueous conversion coating bath containing one-half percent by weight of the dry mix of Example 3(b), and dried as in Example 14. The finished dried panels were significantly lighter in color than those of Example 14 but showed no significantly lower corrosion resistance. This example illustrates a dilute bath.

The conversion coatings obtained according to the various above examples varied in color on the steel panels from a golden brown at the lower concentrations to dark brown with an iridescent blue at the higher concentrations; on galvanized steel from a dull (i.e., lustreless) gray to brown; and on the aluminum from substantially colorless at the lowest concentrations to lighter brown at increased concentrations and dull brown at the higher concentrations.

Example 16.—Other chromic oxide and dichromate compositions (a) Example 15 was repeated on steel panels, except that its treating bath was replaced by one prepared by diluting six parts by volume of a treating concentrate composed by weight of forty-three parts of chromic oxide (as of Example 1), nineteen parts of lithium dichromate (i.e., $Li_2Cr_2O_7 \cdot 2H_2O$) and thirty-eight parts of water, with ninety-four parts by volume of water. A brown conversion coating was produced on the steel panels.

(b) Repeating the procedure of part (a) hereof on aluminum panels and also on galvanized steel panels, except for initially cleaning them with the silicated alkaline cleaning bath of Example 6 produced a brown complex conversion coating on the aluminum panels, and a gray-brown such coating on the galvanized steel panels.

(c) Replacing the treating concentrate of part (a) hereof by a different one composed by weight of forty-two parts of chromic oxide, eighteen parts of the same lithium dichromate, four parts of potassium acetate and thirty-six parts of water, and repeating its steps produced on steel panels a dull brown complex conversion coating which showed somewhat improved corrosion resistance than that shown by the coating on the steel panels obtained under that part (a) of this example.

The lithium dichromate used in Examples 13, 15 and 16 can be replaced by any other water-soluble dichromate, such as any referred to at page 5, lines 11–16 above, in an amount sufficient to provide the same content of chromium as in those examples and yield comparable results.

The invention includes also the method of producing a complex conversion coating by using as the essential treating agent a single substance which provides both the lithium cation and the hexavalent chromium, for example, any form of lithium dichromate such as its crystalline form of Example 3(b) containing two molecules of water of crystallization. The method employing lithium dichromate is illustrated by, but not restricted to:

Example 17.—Lithium dichromate used alone to provide lithium cation and hexavalent chromium (a) Steel panels were initially cleaned as in Example 6 and immersed for thirty seconds in a treating bath maintained at 80° F. and containing by weight twelve parts of lithium dichromate ($2H_2O$) dissolved in ninety-four parts of water. The thus treated panels, dried as in Example 13, where covered with a brown conversion coating.

(b) Repeating the procedure of part (a) hereof on aluminum panels, initially cleaned with the silicated alkaline cleaning bath of Example 6, produced on them also a brown conversion coating.

Both of these coatings manifest good corrosion resistance.

Example 18.—Concentrate containing phosphoric acid

The panels of the various metals can be treated in a reaction or conversion coating bath prepared from a concentrate containing, say, ten to about fifteen percent of orthophosphoric acid (80% $H_3PO_4$). A suitable concentrate for such a bath can contain, by weight, for example.

| | Percent |
|---|---|
| Chromium trioxide ($CrO_3$) | 23.0 |
| Lithium nitrate | 6.4 |
| Orthophosphoric acid (80% $H_3PO_4$) | 12.4 |
| Water | 58.2 |

Aluminum and steel panels initially were cleaned and rinsed as in Example 6. The panels then were immersed in respectively separate baths for thirty seconds, each bath maintained at 90° F. and containing 3.5% by volume of the concentrate (of this example) with the balance being water. The thus treated panels, after being rinsed and dried as in Examples 6 and 13, showed a rather golden brown conversion coating film on the aluminum, and a somewhat bluish to brown film on the steel. A somewhat lighter bluish to brown film was produced on similarly treated galvanized steel panels. All three and particularly the aluminum were indicated to be better films with apparently enhanced thickness and particularly so with the aluminum.

Example 19.—Concentrate with phosphoric acid and anionic surfactant

A further improvement over the results provided by the treating baths prepared as in the Example 18, particularly in overall uniformity of the exposed surface resulting coatings, stems from adding an effectively compatible content of an anionic surfactant to its concentrate. Beneficially effective are the perfluoroalkyl sulfonic acids surfactants having eight carbon atoms (with alkyl being generic to open chain alkyl as well as dimethyl and ethyl substituted cyclohexyl) by use to the extent of, say, from about 0.1 to about 0.5 percent. Such a concentrate is shown by, but not limited, to:

| | Percent |
|---|---|
| Chromium trioxide ($CrO_3$) | 23.0 |
| Lithium nitrate | 6.4 |
| Orthophosphoric acid (80% $H_3PO_4$) | 12.3 |
| Water | 58.1 |
| Perfluoro normal-octyl sulfonic acid | 0.2 |

The specific perfluoro octyl sulfonic acid can be replaced by the same percent of another such acid as 2,5-dimethylcyclohexyl sulfonic acid or 4-ethylcyclohexyl sulfonic acid. Aluminum, steel, and galvanized steel panels were cleaned and rinsed and immersed in their respectively separate baths containing 3.5% by volume of the concentrate of this example, with the rest being water, and then treated as in Example 18. The resulting conversion coatings showed about the same respective colors as noted in Example 18 but were still further improved by showing an overall outward uniformity.

The conversion coating baths of Examples 18 and 19 need not be limited to the specifically used percentage of their respectively specifically tabulated concentrates. Thus, good results are obtained also if the quantity of the concentrate used of either of those examples is varied from about 1 to about 5% by volume with the rest being water.

An anionic wetting agent, beneficially one or more of the perfluoro octyl sulfonic acids (described in Example 18) also can be included in suitable amounts in any of the compositions of any of the other examples, including the corresponding reaction or conversion coating baths prepared by using them in the concentration of the respective example or in any different effective concentration such as within the ranges disclosed.

Use of reaction or conversion coating baths of the invention is not restricted merely to aluminum, steel, and galvanized steel. Suitably effective corrosion resistant reaction or conversion coatings can be obtained by relatively similarly treating a ferrous or non-ferrous metal ordinarily subject to oxidation corrosion after being sufficiently exposed to an ambient oxidation-corrosion-inducing atmosphere, such as are much earlier above described and which also include cadmium and titanium.

The bath temperature may be up to about 200° F. with a better range from about 80° to about 120° F., and optimally from about 90° to 100° F. The choice can be governed by the particular conditions met and results desired.

The conversion coating treating baths and the method of the invention are not limited to any particular pH. In general, the baths of the various examples, especially those prepared with chromic oxide, fall within the range of from about pH 1 to about pH 2. Also, satisfactory and suitable coatings were, and are, obtained with baths up to pH 6 and even with baths adjusted with an alkali such as sodium hydroxide to a pH beyond that, as a generally good upper limit, with good practical operating even up to pH 10. However, in baths prepared from the concentrates of Examples 18 and 19, which contain phosphoric acid, the pH of the reaction coating treating bath beneficially should be kept below pH 7 and advantageously significantly below it.

The examples wherein chromic oxide is the sole chromic acid source need not be limited to that alone. Depending on cost and other considerations, the chromic acid can be replaced at least in part by about the chromic oxide equivalent amount of any water-soluble dichromate such as any of those referred to above. Such substitution even can be complete as illustrated by Example 17.

The water-soluble lithium salt of any of the examples can be replaced in part or as a whole by about the lithium cation equivalent of any other water-soluble lithium salt so long as its anion is other than fluorine and is inert to chromic acid (whether from chromic oxide or a water-soluble dichromate) at the selected operating conditions.

The various mixtures, concentrates and conversion coating treating baths of all of the examples show that the compositions and method of the invention are founded on dependence on (i) the chromium trioxide (in any of its illustrative forms named in the specification and claims) and (ii) the cation lithium (as a water-soluble salt of it of the limited type mentioned in the specification and claims) as the "co-acting essential conversion-coating-producing constituents" to provide the benefits of the various compositions and the method of the invention.

For that reason, the claims recite that the composition, "as to its co-acting essential conversion-coating-producing constituents, consists essentially of" the (i) chromium trioxide and the (ii) lithium salt constituents. This language is used in the claims so as not to preclude the possibility that the claimed compositions may contain amounts, which generally would be significantly minor to that of the chromium constituent, of other agents.

The claimed compositions thus might contain one or more agents compatible with the chromium oxide and the lithium cation constituents, but for purposes other than that of the essential co-acting function of the chromium trioxide and the lithuim cation in their primary provoking and provision of the complex or reaction, conversion corrosion-resistant coating. Illustrative of such other substances are the wetting agents, buffering agents, and the phosphoric acid which latter merely may contribute to the initial acidic effect on the clean starting metal surface. Thus, the purpose of any such other substances as well as a wetting agent, buffering agent, or phosphoric acid is other than "conversion-coating-producing."

Neither a buffering agent nor a wetting agent is essential to the ordinary satisfactory operation of the conversion coating baths and method of the invention. Where it is desirable to operate at a selected pH fixed by some particular buffering agent compatible with the other ingredients of the bath, any such buffering agent can be used in suitable concentration in any of the above examples or others of different concentrations of the selected essential ingredients. Likewise, any compatible non-ionic or preferably anionic wetting agent can be used in place of any of them contained in any of the illustrative examples or in any other of such examples or in any other compositions of different respective amounts of the essential constituents.

The devices or parts treated by immersion for a suitable time in any of the baths of the invention may be dried or baked under any conditions other than those disclosed in the specific examples. The drying and/or baking conditions are limited usually solely to being below any temperature, or any excessive time of exposure at a selected temperature, at which there could occur deleterious change in, or reaction of, the coating or any of its constituents (e.g. dye or pigment) with any of the contents of any drying gas or of the surrounding atmosphere. Simple laboratory drying or baking test can show whether any selected temperature is suitable or may be raised or should be lowered.

The final coatings produced by the treating baths and method of the invention are uniform, hard, ductile, adherent and non-peeling.

While the invention has been explained by detailed description of certain illustrative embodiments of it, it is understood that various substitutions and changes can be made in any of the illustrative embodiments within the scope of the appended claims which are intended also to cover equivalents of the specific embodiments.

What is claimed is:

1. A composition effective to produce a complex conversion coating providing enhanced corrosion-resistance on a metal member of the class consisting of ferrous and non-ferrous metals ordinarily subject to oxidation corrosion when exposed to an ambient oxidation-corrosion-inducing atmosphere, by immersing said metal for a sufficient time therefor in an aqueous solution of said composition which, as to its co-acting essential conversion-coating-producing constituents, consists essentially of:
   (i) chromium trioxide in the form of at least one member of the class consisting of chromic oxide, chromic acid, and a water-soluble dichromate; and
   (ii) lithium in the form of a water-soluble lithium salt whose anion is other than fluorine-containing and compatible in aqueous medium with chromic acid and also with the dichromate anion;
the content, by weight, of chromium from the chromium trioxide-contributing member being at least about equal to the lithium cation content.

2. A composition as claimed in claim 1, wherein the content of chromium from the chromium trioxide-contributing member is at least about one and one-half to about five hundred times the lithium cation content.

3. A composition as claimed in claim 2, wherein the content of chromium from the chromium trioxide-contributing member is at least about seven times the lithium cation content.

4. A mixture composition effective to produce a complex conversion coating providing enhanced corrosion-resistance on a metal member of the class consisting of ferrous and non-ferrous metals ordinarily subject to oxidation corrosion when exposed to an ambient oxidation-corrosion-inducing atmosphere, by immersing said metal for a sufficient time therefor in an aqueous solution of said mixture in a suitable concentration in the water therefor, which mixture, as to its co-acting essential conversion-coating-producing constituents, consists essentially of:
   (i) chromium trioxide in the form of at least one member of the class consisting of chromic oxide, chromic acid, and a water-soluble dichromate; and
   (ii) lithium in the form of a water-soluble lithium salt whose anion is other than fluorine-containing and compatible in aqueous medium with chromic acid and also with the dichromate anion;
said constituents (i) and (ii) being so proportioned as to provide from about one to about five hundred parts of chromium from constituent (i) per part of lithium.

5. A mixture as claimed in claim 4, wherein said constituents (i) and (ii) are proportioned to provide at least about seven parts of chromium from constituent (i) per part of lithium.

6. An aqueous concentrate composition effective to produce a complex conversion coating providing enhanced corrosion-resistance on a metal member of the class consisting of ferrous and non-ferrous metals ordinarily subject to oxidation corrosion when exposed to an ambient oxidation-corrosion-inducing atmosphere, by immersing said metal for a sufficient time therefor in an aqueous solution of said concentrate which contains (a) water as its minor portion by weight and to the extent of at least about thirty percent thereof and (b) dissolved in the water as the co-acting essential conversion-coating-producing constituents:
   (i) chromium trioxide in the form of at least one member of the class consisting of chromic oxide, chromic acid, and a water-soluble dichromate; and
   (ii) lithium in the form of a water-soluble lithium salt whose anion is other than fluorine-containing and compatible in aqueous medium with chromic acid and also with the dichromate anion;
said co-acting constituents (i) and (ii) jointly by weight being the major portion of the concentrate and so proportioned as to provide from about one to about five hundred parts of chromium from constituent (i) per part of lithium.

7. An aqueous concentrate as claimed in claim 6, wherein said constituents (i) and (ii) are proportioned to provide at least about seven parts of chromium from constituent (i) per part of lithium.

8. A concentrate as claimed in claim 7, which contains also from about 0.1 to about 0.5 percent of a perfluorooctyl sulfonic acid wherein the octyl group is a member of the class consisting of open chain octyl, dimethylcyclohexyl, and ethylcyclohexyl.

9. A concentrate as claimed in claim 8, wherein the perfluoro-octyl group is a member of the class consisting of perfluoro (a) normal-octyl, (b) 2,5-dimethylcyclohexyl, and (c) 4-ethylcyclohexyl.

10. A concentrate as claimed in claim 9, which contains by weight about 23.8% of $CrO_3$, about 6.4% of lithium nitrate, about 58.1% of water, and also about 9.84% of orthophosphoric acid (on the anhydrous basis).

11. An aqueous concentrate as claimed in claim 6, wherein the lithium is provided by at least one water-soluble inorganic lithium salt.

12. A concentrate as claimed in claim 11, wherein by weight from about forty to about fifty-five parts of chromic acid and from about ten to about fifteen parts of lithium nitrate are dissolved in from about thirty to about forty-five parts of water.

13. A concentrate as claimed in claim 6, which includes in solution a water-soluble dyestuff compatible with the concentrate composition and stable at the operating conditions at which the aqueous conversion coating treating bath to be diluted from said concentrate is to be used, said dyestuff being in sufficient concentration in said concentrate to give the desired depth of its color in the finished conversion coating to be produced on the selected metal to be treated therefor in said bath.

14. An aqueous conversion coating bath effective to produce a complex conversion coating providing enhanced corrosion resistance on a metal member of the class consisting of ferrous and non-ferrous metals ordinarily subject to oxidation corrosion when exposed to an ambient oxidation-corrosion-inducing atmosphere, by immersing said metal for a sufficient time therefor in said bath which has dissolved in its water as the co-acting essential conversion-coating-producing constituents:
  (i) chromium trioxide in the form of at least one member of the class consisting of chromium oxide, chromic acid, and a water-soluble dichromate, and to the extent that the chromium content therefrom in the bath is at least about one-half percent by weight; and
  (ii) at least one water-soluble lithium salt whose anion is other than fluorine-containing and to the extent that the lithium cation content of the bath is at least about one-tenth percent by weight;
said constituents (i) and (ii) being so proportioned to provide from about one to about five hundred parts of chromium from constituent (i) per part of lithium.

15. A coating bath as claimed in claim 14, wherein the lithium cation content is at least three-tenths percent, and the chromium content from constituent (i) is at least about two percent.

16. The method of producing a complex conversion corrosion-resisting coating on clean surfaces of a metal member of the class of ferrous and non-ferrous metals ordinarily subject to oxidation corrosion on exposure to an ambient oxidation corrosion-inducing atmosphere, which method comprises (a) immersing said metal in an aqueous treating bath for a time sufficient for such desired coating to be produced on it at the temperature of the bath which has dissolved in its water as its co-acting essential conversion-coating-producing constituents:
  (i) chromium trioxide in the form of at least one member of the class consisting of chromium oxide, chromic acid, and a water-soluble dichromate, and to the extent that the chromium content in the bath therefrom is at least about one-half percent by weight; and
  (ii) at least one water-soluble lithium salt whose anion is other than fluorine-containing and to the extent that the lithium cation content of the bath is at least about one-tenth percent by weight;
said constituents (i) and (ii) being so proportioned to provide from about one to about five hundred parts of chromium from constituent (i) per part of lithium; and
  (b) removing the metal from the bath.

17. The method as claimed in claim 16, wherein the constituents (i) and (ii) are so proportioned to provide at least about seven parts of chromium from constituent (i) per part of lithium.

18. The method as claimed in claim 16, wherein the treating bath is maintained at from ambient temperature to about 100° F.

References Cited
UNITED STATES PATENTS

| | | | |
|---|---|---|---|
| 2,393,640 | 1/1946 | King | 148—6.2 X |
| 2,564,864 | 8/1951 | Thompson | 148—6.1 X |
| 2,868,679 | 1/1959 | Pimpley | 148—6.2 |
| 2,987,427 | 6/1961 | Shaw | 148—6.21 |

RALPH S. KENDALL, *Primary Examiner.*